US010168699B1

(12) United States Patent
Theobald (10) Patent No.: US 10,168,699 B1
(45) Date of Patent: Jan. 1, 2019

(54) INTERACTIONS BETWEEN A VEHICLE AND A BEING ENCOUNTERED BY THE VEHICLE

(71) Applicant: Daniel Theobald, Somerville, MA (US)

(72) Inventor: Daniel Theobald, Somerville, MA (US)

(73) Assignee: VECNA TECHNOLOGIES, INC., Cambridge, MA (US)

( * ) Notice: Subject to any disclaimer, the term of this patent is extended or adjusted under 35 U.S.C. 154(b) by 0 days.

(21) Appl. No.: 14/610,310

(22) Filed: Jan. 30, 2015

(51) Int. Cl.
*G05D 1/00* (2006.01)

(52) U.S. Cl.
CPC .................... *G05D 1/0088* (2013.01)

(58) Field of Classification Search
CPC ..... G01S 17/023; G01S 17/936; G05D 1/024; G05D 1/0246; G05D 1/027; G05D 1/0274; G05D 1/0278; G05D 2201/0213; G07F 17/3234; G06Q 50/01; G08G 1/16
USPC ......... 701/2, 25, 28; 700/245, 253; 707/755; 348/218.1; 463/42
See application file for complete search history.

(56) References Cited

U.S. PATENT DOCUMENTS

| | | | |
|---|---|---|---|
| 5,659,779 A * | 8/1997 | Laird | B61L 27/04 700/245 |
| 7,348,747 B1 | 3/2008 | Theobald et al. | |
| 7,719,222 B2 | 5/2010 | Theobald | |
| 8,102,134 B1 | 1/2012 | Theobald | |
| 8,106,616 B1 | 1/2012 | Theobald | |
| 2007/0276541 A1* | 11/2007 | Sawasaki | G05D 1/0246 700/253 |
| 2007/0291130 A1* | 12/2007 | Broggi | G01S 17/023 348/218.1 |
| 2009/0306881 A1* | 12/2009 | Dolgov | G05D 1/0246 701/28 |
| 2010/0106356 A1* | 4/2010 | Trepagnier | G01S 17/023 701/25 |
| 2011/0172822 A1 | 7/2011 | Ziegler et al. | |
| 2013/0085625 A1* | 4/2013 | Wolfe | G06F 17/00 701/1 |
| 2013/0184980 A1* | 7/2013 | Ichikawa | B25J 9/1676 701/301 |
| 2014/0039676 A1* | 2/2014 | Fernando | G05D 1/024 700/253 |
| 2014/0039680 A1* | 2/2014 | Angle | B25J 5/007 700/259 |
| 2014/0142757 A1* | 5/2014 | Ziegler | B25J 5/007 700/255 |
| 2014/0222271 A1* | 8/2014 | Merten | H02J 7/025 701/22 |
| 2014/0360832 A1* | 12/2014 | Aldrich | H02G 11/02 191/12.2 R |
| 2014/0370989 A1* | 12/2014 | Acres | G07F 17/3232 463/42 |
| 2015/0012209 A1* | 1/2015 | Park | G01C 21/20 701/408 |
| 2015/0019043 A1* | 1/2015 | Creasey | G05D 1/0038 701/2 |

(Continued)

*Primary Examiner* — Anne M Antonucci
*Assistant Examiner* — Sanjeev Malhotra (57) ABSTRACT

Methods, systems and devices are provided involving at least one vehicle and at least one being such as a person. In one method, the vehicle is operated to autonomously move within an environment. The vehicle is also operated to autonomously acknowledge presence of the being approximately when the vehicle encounters the being during the moving of the vehicle.

12 Claims, 10 Drawing Sheets

(56) References Cited

U.S. PATENT DOCUMENTS

| | | | |
|---|---|---|---|
| 2015/0039157 A1* | 2/2015 | Wolfe | G06F 17/00 701/2 |
| 2015/0045122 A1* | 2/2015 | Acres | G07F 17/3218 463/42 |
| 2015/0073586 A1* | 3/2015 | Weiss | B66F 9/063 700/216 |
| 2015/0149398 A1* | 5/2015 | Hong | G06N 5/025 706/47 |
| 2015/0212585 A1* | 7/2015 | Latta | G06F 3/005 345/158 |
| 2015/0224640 A1* | 8/2015 | Vu | B25J 5/007 700/259 |
| 2015/0293897 A1* | 10/2015 | Myslinski | G06Q 50/01 707/755 |
| 2016/0086385 A1* | 3/2016 | Gourlay | G06T 19/20 382/154 |

* cited by examiner

INTERACTIONS BETWEEN A VEHICLE AND A BEING ENCOUNTERED BY THE VEHICLE

BACKGROUND OF THE DISCLOSURE

1. Technical Field

This disclosure relates generally to a vehicle and, more particularly, to interactions between a vehicle and a being encountered by the vehicle.

2. Background Information

A vehicle such as a mobile robot may be used to perform various tasks. During performance of such tasks, the mobile robot may encounter one or more people. These encounters may be uncomfortable, however, since the encountered people may be unsure whether the mobile robot is aware of their presence.

There is a need in the art for methods, systems and devices for improving interactions between a vehicle such as a mobile robot and a being such as an individual.

SUMMARY OF THE DISCLOSURE

Methods, systems and devices are provided involving at least one vehicle and at least one being. The vehicle may be a mobile robot. The being may be an individual. In one method, the vehicle is operated to autonomously move within an environment. The vehicle is also operated to autonomously acknowledge presence of the being approximately when the vehicle encounters the being during the moving of the vehicle.

BRIEF DESCRIPTION OF THE DRAWINGS

The following detailed description will be better understood when read in conjunction with the appended drawings, in which there is shown one or more embodiments of the present disclosure. It should be understood, however, that the various embodiments of the present disclosure are not limited to the precise arrangements and instrumentalities shown in the drawings.

DETAILED DESCRIPTION

Figure 1:
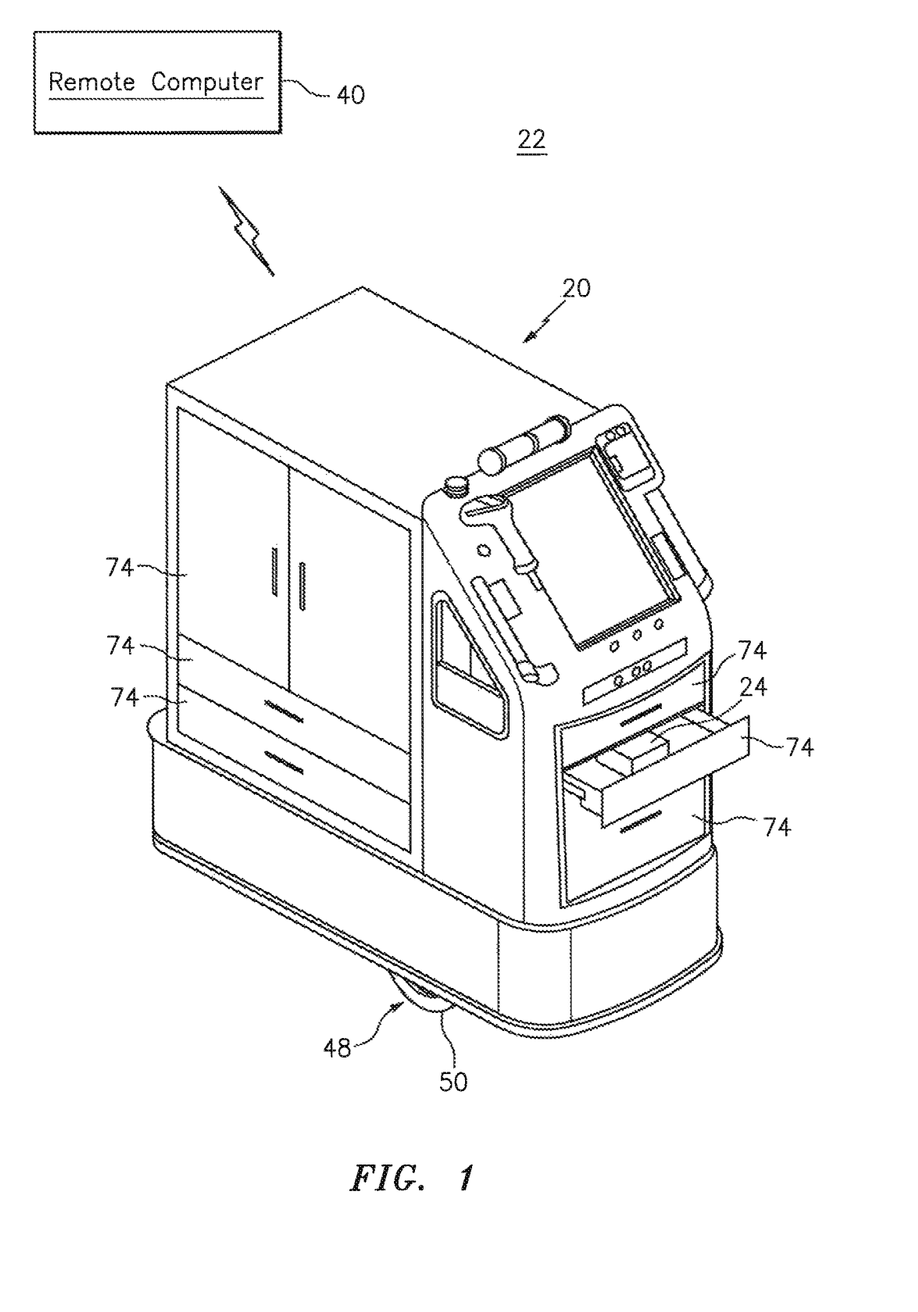
FIG. 1 is a perspective diagrammatic illustration of a mobile robot within an operating environment with a remote computer.

FIG. 1 illustrates a vehicle such as a mobile robot 20 configured to perform one or more tasks within an operating environment 22. The mobile robot 20 may be tasked to gather, store, transport and/or deliver one or more items 24. The mobile robot 20 may also or alternatively be tasked to reconfigure and/or otherwise manipulate one or more items 24. The mobile robot 20 of the present disclosure, however, is not limited to performing the foregoing exemplary tasks, nor item related tasks in general. Furthermore, while the vehicle is referred to herein as a mobile robot, the vehicle may alternatively be configured as another type of manned or unmanned vehicle such as: a drone; an automobile; a truck; industrial/agricultural/construction equipment such as a tractor, a crane or a forklift; an aircraft; a spacecraft; a watercraft (e.g., a boat, ship or submersible); a train; a tram; etc.

The operating environment 22 may be located inside and/or outside of one or more permanent and/or temporary buildings. The mobile robot 20, for example, may perform its task(s) in a hospital or other medical facility. The mobile robot 20 may perform its task(s) at a warehouse and/or an order fulfillment center. The mobile robot 20 may perform its task(s) at a government and/or non-government complex, campus, compound and/or base. The mobile robot 20, of course, may also or alternatively perform its task(s) at one or more indoor and/or outdoor areas other than those described above. For example, the mobile robot 20 may perform its task(s) onboard a vehicle such as a train, a ship, an aircraft, a spacecraft or a submersible. In another example, the mobile robot 20 may perform its task(s) at a location which is remote from other buildings; e.g., during a surveying, reconnaissance and/or exploration mission. For ease of description, however, the operating environment 22 is described below as a hospital.

Under certain circumstances, the mobile robot 20 may encounter one or more beings 26 during the performance of one or more of its tasks. For ease of description, the being(s) 26 are referred to herein as human(s), individual(s), people, persons, etc. However, the being(s) 26 may also or alternatively be animals such as service animals, companion animals, domesticated animals, pets, farm animals, livestock, etc.

Broadly speaking, the term "encounter" may describe a situation where a mobile robot 20 and an individual 26 temporarily occupy a common region 28 of an operating environment 22. Non-limiting examples of such a situation are illustrated in FIGS. 2-7.

Figure 2:
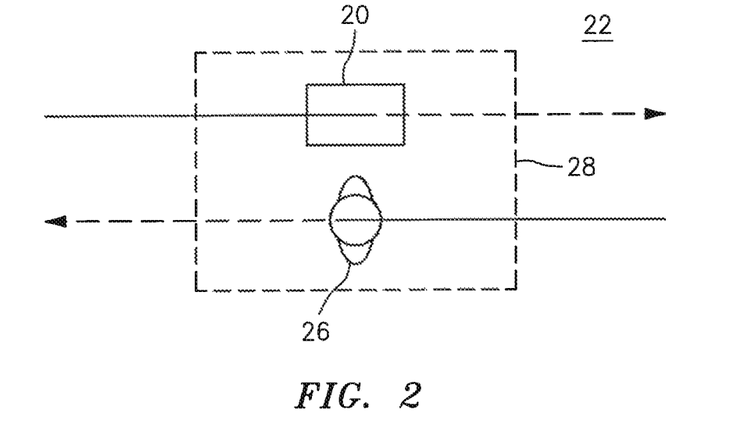
FIGS. 2-8 are schematic illustrations of a vehicle encountering a being while moving within an operating environment.
Figure 3:
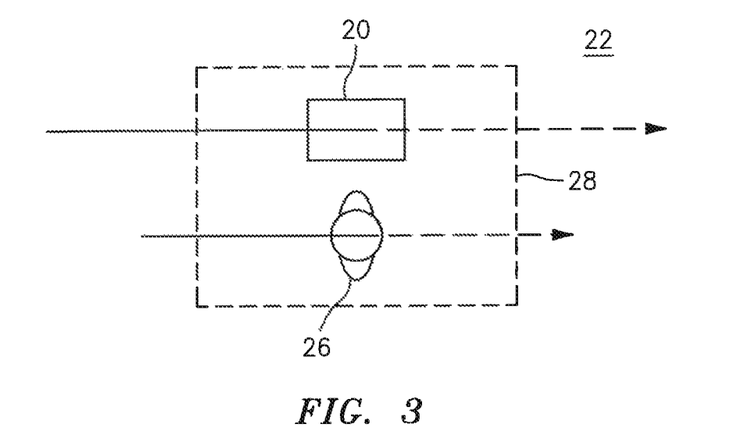
Figure 4:
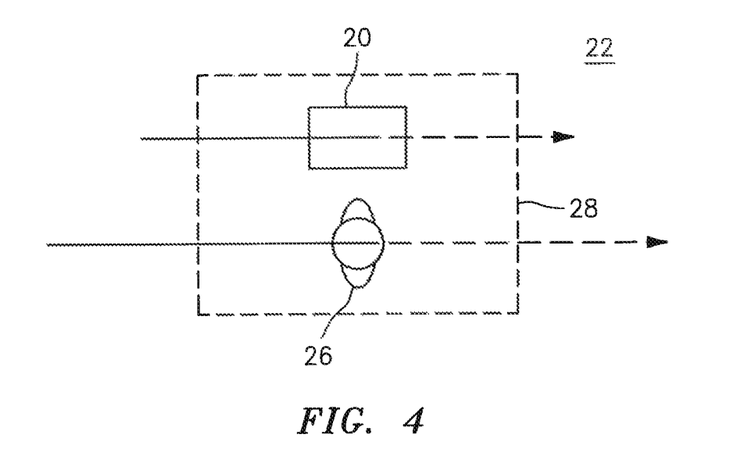

Referring to FIGS. 2 to 4, the mobile robot 20 encounters and passes an individual 26 while moving along a pathway. Examples of such a pathway include, but are not limited to, a hallway, an aisle next to or between rows of storage units (e.g., shelves, bins, compartments, etc.), a walkway, a corridor, etc. In FIG. 2, the mobile robot 20 and the individual 26 are traveling in different (here opposite) directions. In FIG. 3, the mobile robot 20 and the individual 26 are traveling in the same direction, where the mobile robot 20 is traveling faster than the individual 26 and approaches and passes the individual 26 from behind. In FIG. 4, the mobile robot 20 and the individual 26 are traveling in the same direction, where the individual 26 is traveling faster than the mobile robot 20 and approaches and passes the mobile robot 20 from behind.

Figure 5:
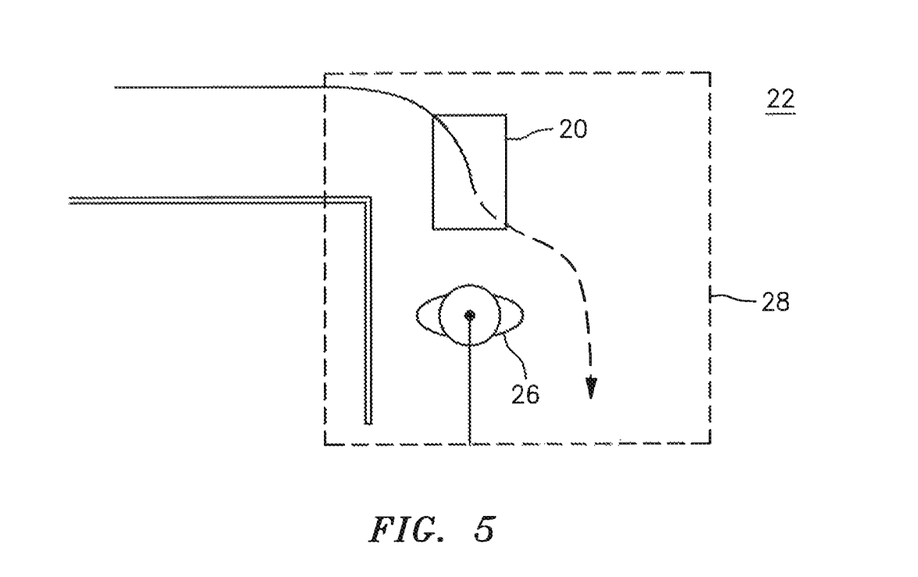
Figure 6:
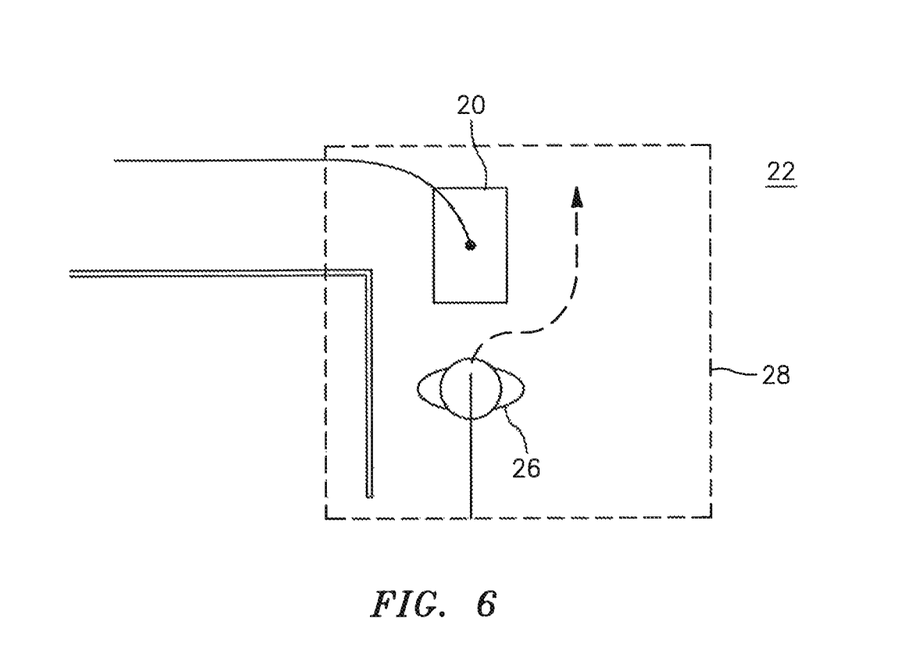

Referring to FIGS. 5 and 6, the mobile robot 20 (e.g., unexpectedly) encounters an individual 26 while turning around a (e.g., bind) corner. In FIG. 5, the mobile robot 20 performs a maneuver and passes the individual 26. In FIG. 6, the individual 26 performs a maneuver and passes the mobile robot 20. Of course, in other situations, both the mobile robot 20 and the individual 26 may maneuver to pass one another.

Figure 7:
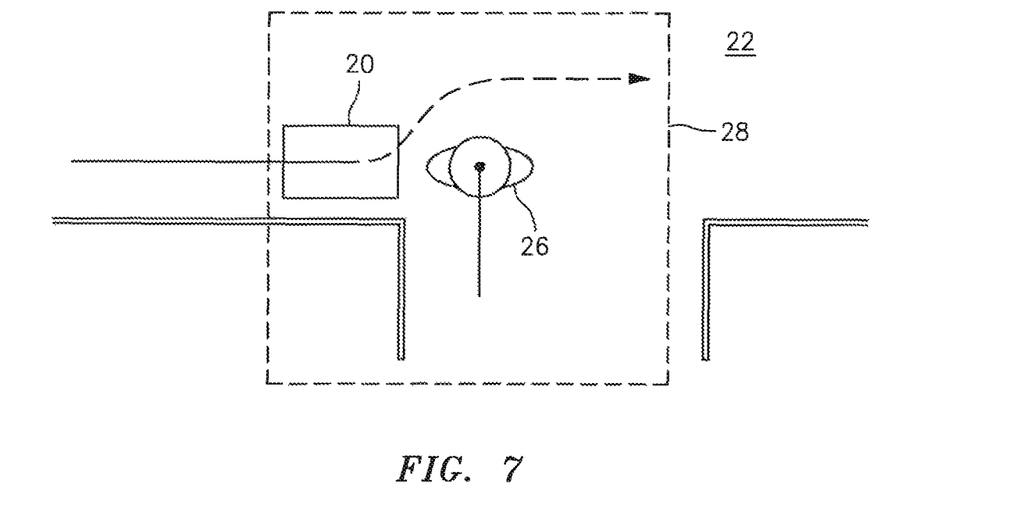
Figure 8:
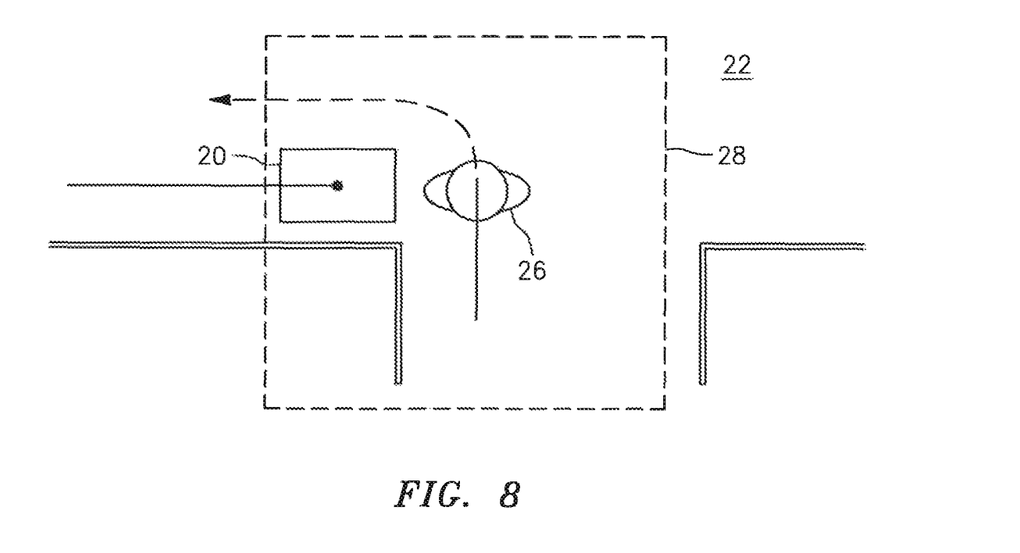

Referring to FIGS. 7 and 8, the mobile robot 20 (e.g., unexpectedly) encounters an individual 26 while moving along a pathway. Here, the individual 26 moves into the pathway from another pathway. In FIG. 7, the mobile robot 20 performs a maneuver and passes the individual 26. In FIG. 8, the individual 26 performs a maneuver and passes the mobile robot 20. Of course, in other situations, both the mobile robot 20 and the individual 26 may maneuver to pass one another. Furthermore, the foregoing encounters are intended merely to be exemplary and the present disclosure is not limited thereto.

An extent of the common region 28 may be specified based on various parameters. For example, the common region 28 may be relatively large where there is a relatively small number of people per unit of area of the operating environment 22; e.g., in a warehouse or storage area. In contrast, the common region 28 may be relatively small where there is a relatively large number of people per unit of area of the operating environment 22; e.g., in a lobby of a hospital, hotel or other business. In another example, the common region 28 may be relatively large where the people 26 encountered by the mobile robot 20 are those (e.g., employees) who are used to encountering mobile robots. In contrast, the common region 28 may be relatively small where the people 26 encountered by the mobile robot 20 are those (e.g., visitors) who are not used to encountering mobile robots.

The common region 28 may be defined by an enclosed or bounded space such as a room, an elevator or a pathway, or a portion thereof. The common region 28 may be defined by what is within "eyesight" or direct line of sight of a typical individual 26. The common region 28 may also or alternatively be defined by a proximity between the mobile robot 20 and the individual 26. For example, the mobile robot 20 and the individual 26 may be considered to occupy a common region 28 where the mobile robot 20 is within ½, 1, 2, 3, . . . , 10, . . . , etc. mobile robot lengths of the individual 26. The mobile robot 20 and the individual 26 may also or alternatively be considered to occupy a common region 28 where an estimated time of arrival (ETA) of the mobile robot 20 to a current or predicted future location of or near the individual 26 is equal to or below a constant or variable (e.g., situation dependent) value. The present disclosure, however, is not limited to the foregoing exemplary parameters or common region 28 bounds.

An individual may become nervous, timid, uneasy or otherwise concerned where he/she encounters a mobile robot in the situations described above. The individual, for example, may be worried that the mobile robot does not sense his/her presence and, thus, the mobile robot may inadvertently/unknowingly collide with him/her. The individual may also or alternatively have a general distrust of technology.

To help reduce or alleviate concerns as described above, the mobile robot 20 may acknowledge the presence of the individual 26 to that individual 26 before and/or during the encounter. The mobile robot 20, for example, may audibly, visually and/or otherwise announce that it senses the presence of the individual 26 within the operating environment 22. The mobile robot 20 may also or alternatively audibly, visually and/or otherwise convey how the mobile robot 20 will operate during the encounter; e.g., pause its movement, continue its movement, divert its movement, etc. Such announcements/conveyances may be made without (or with) additional interaction between the mobile robot 20 and the individual 26 during the encounter.

Referring again to FIG. 1, the mobile robot 20 may be configured as an autonomous mobile robot that performs one or more of its tasks without continuous outside control and/or intervention. The mobile robot 20, for example, may receive instructions to perform a certain task at a certain location. The mobile robot 20 may subsequently determine and perform the operations (s) necessary to complete the task based on, for example, its current location, surrounding obstacles, its operating environment 22, the type of task to be performed, etc. The mobile robot 20 may also adapt to unknown, new and/or changing operating environments without additional (e.g., human) outside control and/or intervention.

The mobile robot 20 may be fully autonomous during performance of one or more of its tasks. The mobile robot 20 may also or alternatively be semi-autonomous during performance of one or more of its tasks. The mobile robot 20 may still also or alternatively be (e.g., remote) controlled by an operator (e.g., a human controller) during performance of one or more of its tasks.

The two "fully autonomous" may be used to describe an apparatus that performs one or more tasks without, for example, any outside control and/or intervention. A fully autonomous mobile robot, for example, may perform a task without receiving instructions (e.g., vectors, commands, etc.) from a human operator during performance of the task.

The term "semi-autonomous" may be used to describe an apparatus that performs one or more tasks without, for example, continuous outside control. A semi-autonomous mobile robot, for example, may perform a task utilizing one or more periodic instructions from an operator (e.g., a human controller) that bound and/or qualify the performance of the task. The instructions may provide, for example, an updated location of where the task is to be performed, identify an unknown obstacle, control the scope of the task, control when the task should be performed, define how the task should be performed, define how the task should not be performed, etc.

Figure 9:
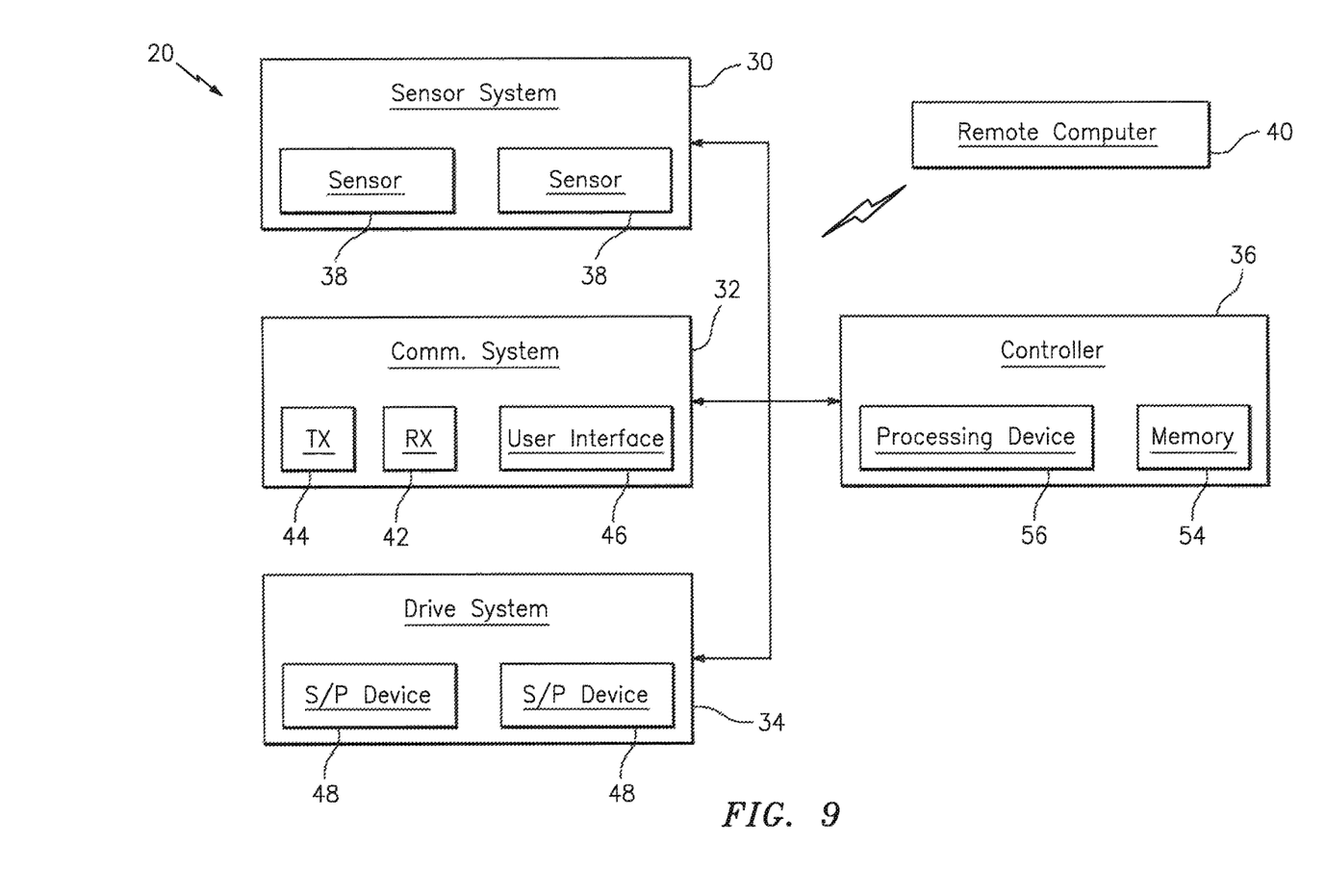
FIG. 9 is a block diagram illustration of a mobile robot system in signal communication with a remote computer.

FIG. 9 is a block diagram of the mobile robot 20. The mobile robot 20 includes a sensor system 30, a communication system 32 and a drive system 34. The mobile robot 20 also includes a controller 36 in signal communication (e.g., hardwired and/or wirelessly connected) with one or more of the other components (e.g., 30, 32, 34) of the mobile robot 20.

The sensor system 30 is adapted for surveying one or more aspects of the mobile robot's operating environment 22. The sensor system 30, for example, may be used for identifying presence of, locating, determining identity of, tracking and determining physical characteristics of one or more aspects of the operating environment 22. These aspects may include, but are not limited to:

Topology of the operating environment 22 or a portion thereof;

Structural features of and/or in the operating environment 22 such as walls, doors, ceilings, stairs, lifts, etc.; and Objects in the operating environment 22 such as other entities (e.g., people 26, animals and/or mobile robots), storage units, items 24, obstructions, etc.

The sensor system 30 may also or alternatively be adapted to receive location data indicative of a location of the mobile robot 20 and/or location(s) of other objects within the operating environment 22.

The sensor system 30 includes one or more sensors 38; e.g., location sensors. These sensors 38 may be operated to spatially locate (e.g., triangulate) the mobile robot 20 relative to, for example, its surrounding environment, its geographic location and/or one or more locators; e.g., RF tags, physical landmarks, etc. Examples of a sensor 38 which may be included with the sensor system 30 include, but are not limited to, a proximity sensor, a global position system (GPS), a radar system, an infrared system, a laser system, a radio transceiver, and a visual location system with at least one optical camera.

The communication system 32 may be adapted to receive data from a remote computer 40 (see also FIG. 1) such as, but not limited to, a central hub. Other examples of a remote computer 40 include, but are not limited to, a tablet computer, a personal computer, a laptop computer, a personal digital assistant (PDA), a cell phone, a smart phone and a Bluetooth enabled device. The communication system 32 may also or alternatively be adapted to send data to a remote computer 40; e.g., the central hub. The communication system 32 of FIG. 8, for example, includes a receiver 42 and a transmitter 44, or a transceiver. The receiver 42 may be a cellular, satellite, radio and/or any other type of receiver. The transmitter 44 may be a cellular, satellite, radio and/or any other type of transmitter.

The communication system 32 is also adapted to acknowledge presence of one or more people or other beings; e.g., visually and/or audibly present at least one acknowledgement to the individual(s) 26. The communication system 32 may still also be adapted to communicate other information to and/or received other information from one or more individuals whom interact with the mobile robot 20 before, during and/or after performance of its task(s). Note, such interactions may be distinct from and unrelated to the encounters discussed above, although interactions and encounters may be paired together in certain situations. In addition, the communication system 32 of the present disclosure is not limited to communicating the foregoing exemplary information.

The communication system 32 of FIG. 9 includes and may communicate the foregoing information (e.g., acknowledgement(s), etc.) using a user interface 46. This user interface 46 may be adapted to present at least some of the information in the form of a visual message, which may include alpha-numeric characters, words (e.g., text-based instructions) and/or graphics. The user interface 46, for example, may be configured as or include a display (e.g., display screen or touch screen), a projector and/or a printer. The user interface 46 may also or alternatively be adapted to present at least some of the information in the form of an audible message, which may include words (e.g., verbal instructions) or code (e.g., a sequence of sounds, a certain tone or pitch, etc.). The user interface 46, for example, may be configured as or include an electro-acoustic transducer such as a loudspeaker. The user interface 46 may still also or alternatively be adapted to visually present at least some of the information using a device such as a laser pointer, a media (e.g., paint, ink, chalk, etc.) applicator, one or more lights (e.g., colored bulbs), etc. The communication system 32 of the present disclosure, of course, is not limited to the foregoing exemplary user interface types or configurations.

The drive system 34 is adapted to move the mobile robot 20 within its operating environment 22; e.g., inside and/or outside of a building. This movement may include general steerable, forward and/or reverse movement. The movement may also include "zero-turn" movement and/or "omnidirectional" movement. Zero turn movement may describe movement where the mobile robot 20 can turn with a zero or very close to zero turning radius. Omnidirectional movement may describe movement where the mobile robot 20 may travel laterally (e.g., substantially sideways or diagonally) without reorienting its body.

Figure 10:
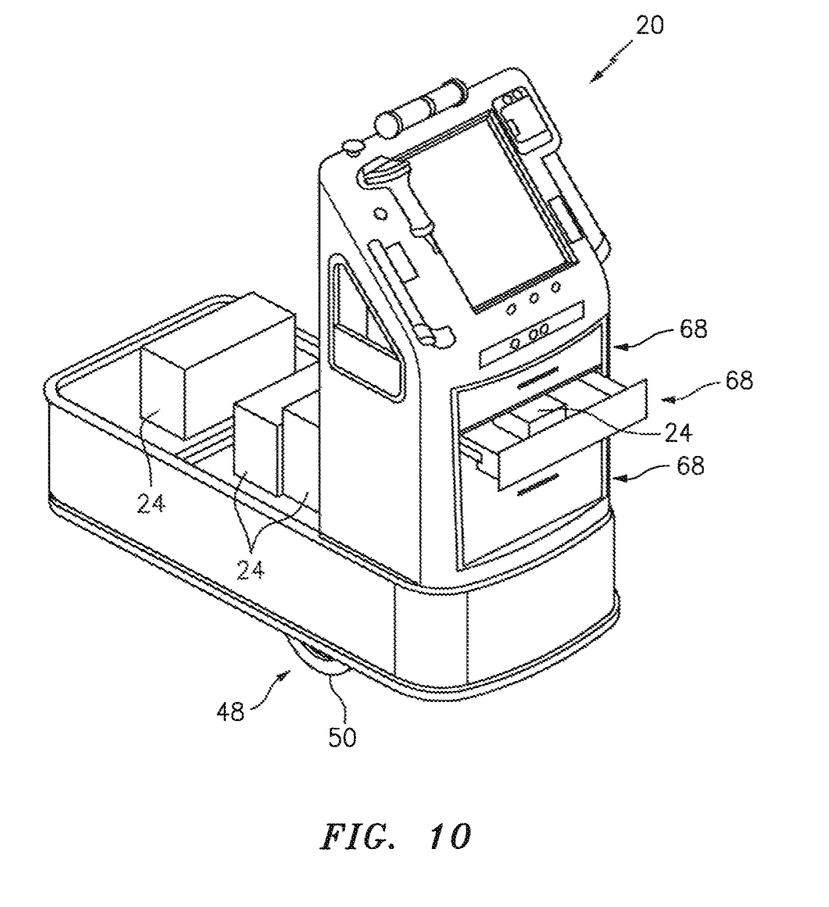
FIG. 10 is a perspective diagrammatic illustration of another mobile robot.
Figure 11:
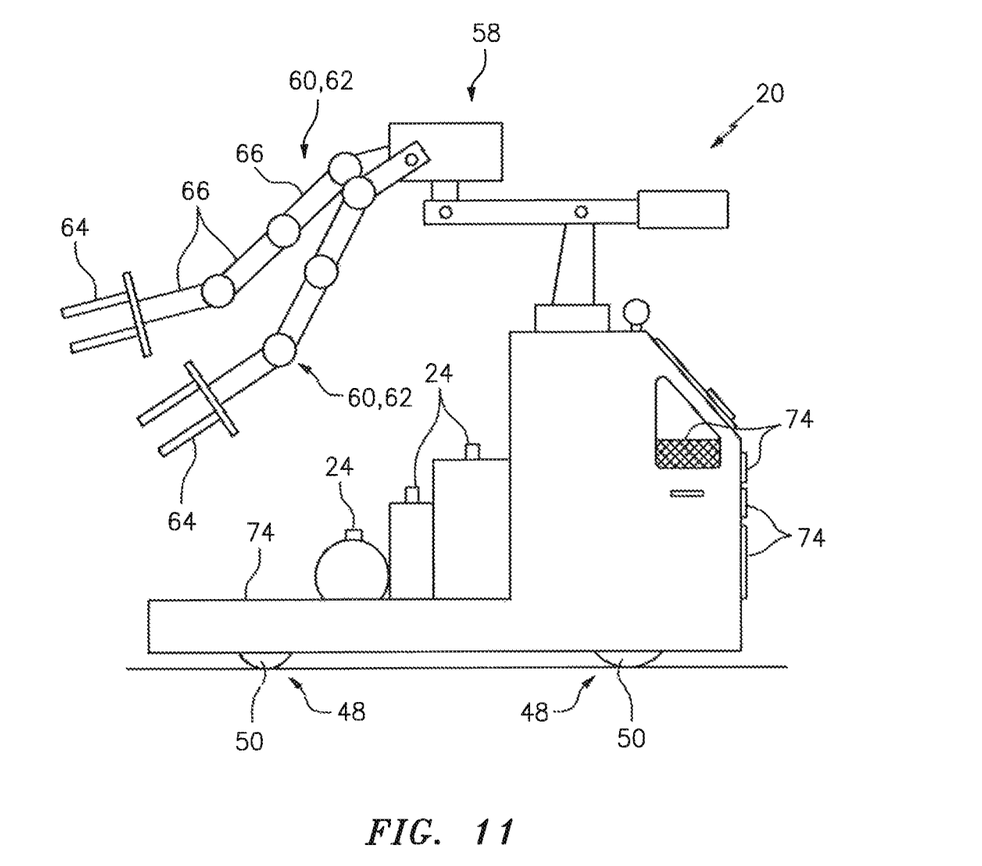
FIG. 11 is a side view diagrammatic illustration of another mobile robot.

The drive system 34 includes one or more steering and/or propulsion ("S/P") devices 48. The drive system 34 of FIGS. 1, 10 and 11, for example, includes a plurality of wheels 50. One or more of these wheels 50 is driven by at least one motor. One or more of the wheels 50 is pivoted so as to steer mobile robot 20 movement. The rotational velocity of some or all of the wheels 50 may also or alternatively be individually controlled so as to provide propulsion and steering. In another example, the drive system 34 of FIG. 12 includes a plurality of motorized (e.g., robotic and multi-linkage) track systems 52. The drive system 34, of course, may also or alternatively include one or more steering and/or propulsion devices with configurations other than those described above and illustrated in the drawings.

It is worth noting, the above described S/P devices 48 may be configured and/or operated so as to provide a desired maneuverability; e.g., steerable forward/reverse movement, zero turn movement, omnidirectional movement, etc. For example, zero turn movement may be enabled utilizing independent all wheel 50 steering, independent motorized track systems as well as various other techniques. Omnidirectional movement may be enabled utilizing independent all wheel 50 steering as well as various other techniques. The mobile robot 20 of the present disclosure, of course, is not limited to any particular devices or techniques for enabling its maneuverability.

The controller 36 may be implemented with hardware or a combination of hardware and software. The hardware may include memory 54 and at least one processing device 56, which may include one or more single-core and/or multi-core processors. The hardware, of course, may also or alternatively include analog and/or digital circuitry other than that described above.

The memory 54 is configured to store software (e.g., program instructions) for execution by the processing device 56, which software execution may control and/or facilitate performance of one or more operations such as those described in the methods below. The memory 54 may be a non-transitory computer readable medium. For example, the memory 54 may be configured as or include a volatile memory and/or a nonvolatile memory. Non-limiting examples of a volatile memory may include a random access memory (RAM) such as a dynamic random access memory (DRAM), a static random access memory (SRAM), a synchronous dynamic random access memory (SDRAM), a video random access memory (VRAM), etc. Non-limiting examples of a nonvolatile memory may include a read only memory (ROM), an electrically erasable programmable read-only memory (EEPROM), a computer hard drive, etc.

Figure 13:
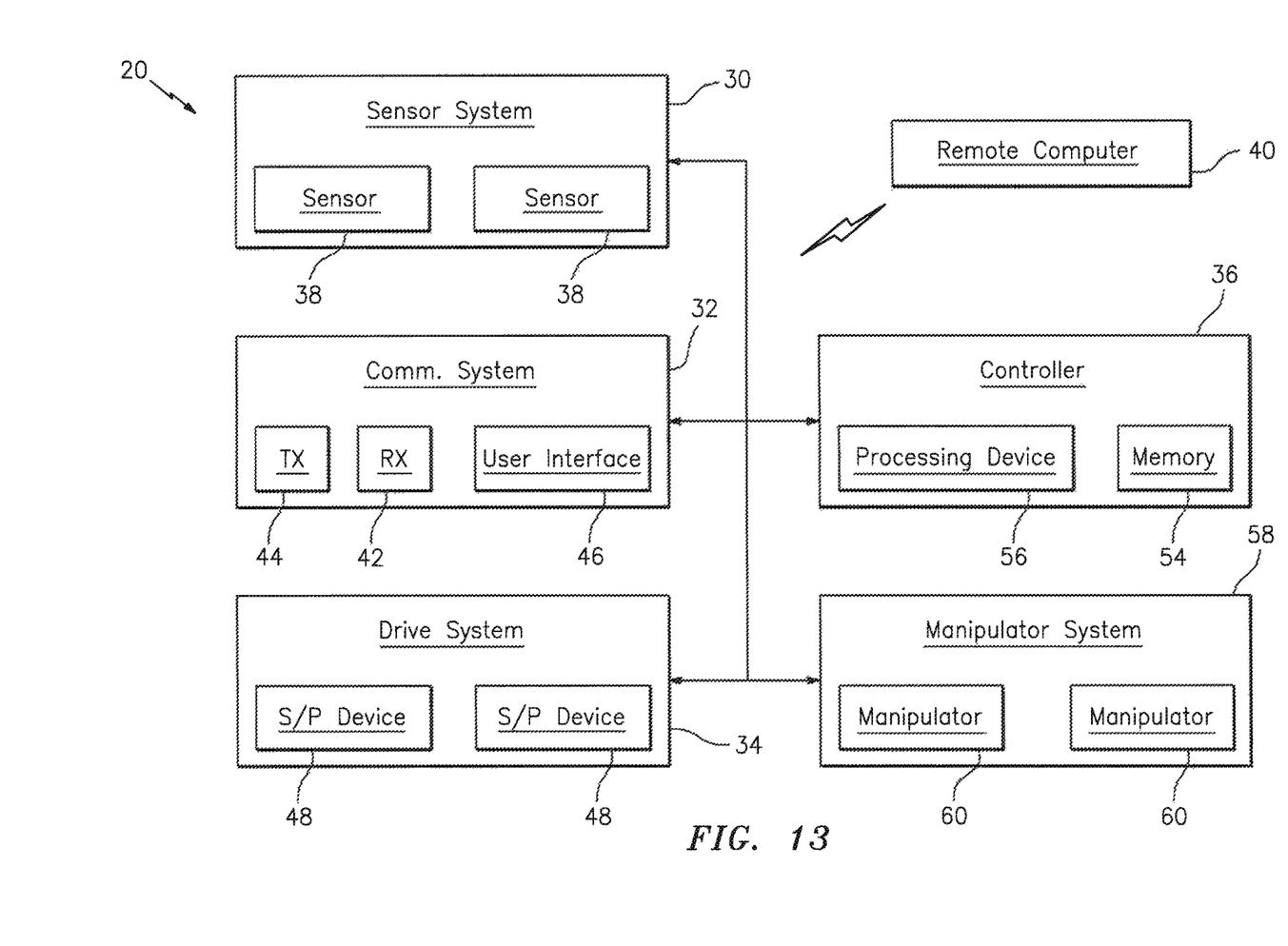
FIG. 13 is a block diagram illustration of another mobile robot system.

The mobile robot 20 of the present disclosure, of course, is not limited to the exemplary configuration and components described above. For example referring to FIG. 13, the mobile robot 20 may also include a manipulator system 58 in signal communication with the controller 36.

The manipulator system 58 includes one or more manipulators 60. These manipulators 60 may be adapted to move or assist with the movement of one or more of items 24. One or more of the manipulators 60, for example, may each be configured as a robotic manipulator arm 62 (see FIGS. 11 and 12). Each manipulator arm 62 may be electronically, hydraulically, pneumatically and/or mechanically actuated. Each manipulator arm 62 may include an end effector 64, which is connected to one or more arm members 66 (e.g., linkages). Examples of an end effector 64 include, but are not limited to, a robotic hand, a gripping device, a suction device, a vacuum device, an electromagnet, a winch, a clasp, the marking device, etc. In another example, one or more of the manipulators 60 may each be configured as a robotic drawer 68 (see FIG. 10) or a robotic cabinet. Each drawer 68 or cabinet door, for example, may be configured with at least one actuator, which is adapted to open and/or close the drawer or cabinet door. Examples of an actuator include, but are not limited to, an electric motor, a hydraulic or pneumatic pump, and a hydraulic cylinder.

The manipulator system 58 may also or alternatively include one or more types of manipulators 60 other than those described above and illustrated in the drawings. For example, one or more of the manipulators 60 may each be configured as a pallet jack, a lift platform, a conveyor system, a slide carriage, a scissor lift or a crane.

Figure 12:
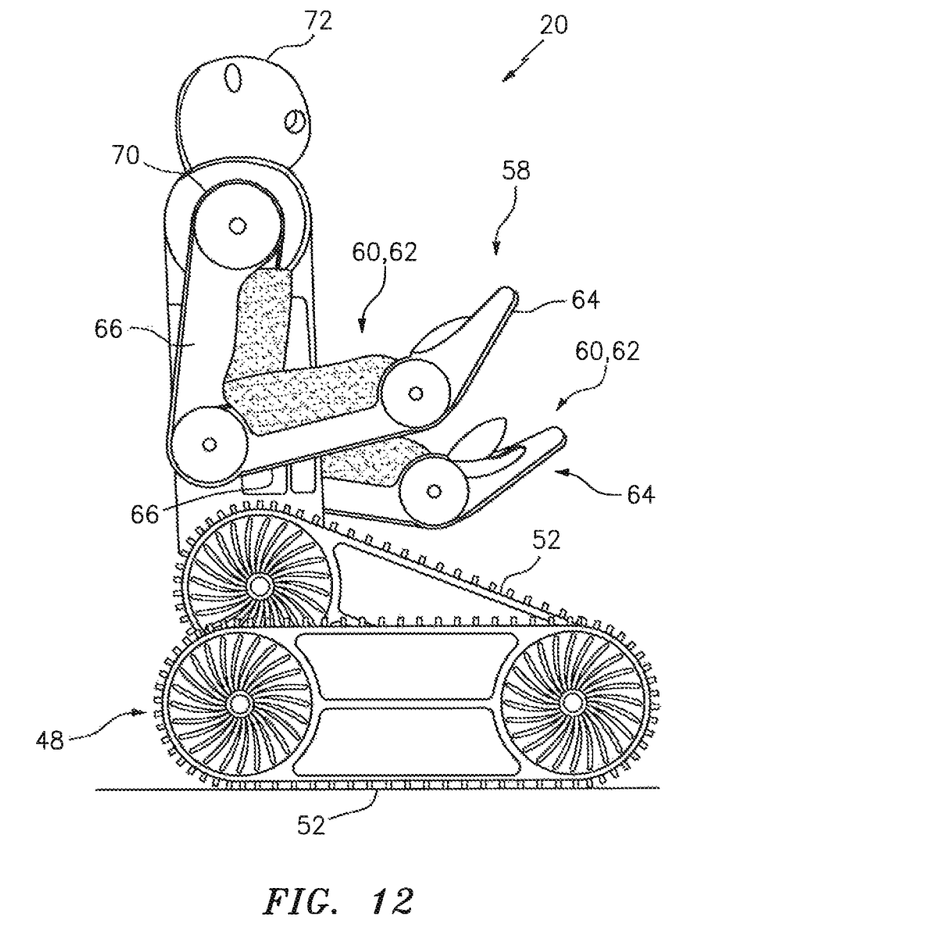
FIG. 12 is a side view diagrammatic illustration of another mobile robot.

The manipulator system 58 may be configured and/or function as a discrete system; e.g., separate from the other systems 30, 32, 34. Alternatively, operation of the manipulator system 58 may be integrated with another system such as the communication system 32. For example, the manipulator system 58 and its manipulator(s) 60 may be controlled to provide visual signals; e.g., gestures. With general reference to FIG. 12, examples of such a visual signal include:

Shrugging, for example, by moving shoulder portions 70 of the robotic manipulator aims 62 up-and-down;

Nodding, for example, by moving a "head" portion 72 of the mobile robot 20 back-and-forth, side-to-side, etc.;

Waving, for example, by moving one of the end effectors 64 back-and-forth; and

Pointing, for example, by moving one of the end effectors 64 such that its distal end points to a desired location.

The manipulator system 58, of course, may be configured and operated to provide (e.g., perform) one or more visual signals and gestures other than those described above such as, for example, a wink, a smile, a fist, a thumbs-up, a flat stop hand, an open palm, etc. Some of these gestures may also be simulated by the display of the user interface 46. The display, for example, may present a face which is animated to wink, smile or exhibit various other facial expressions.

Figure 14:
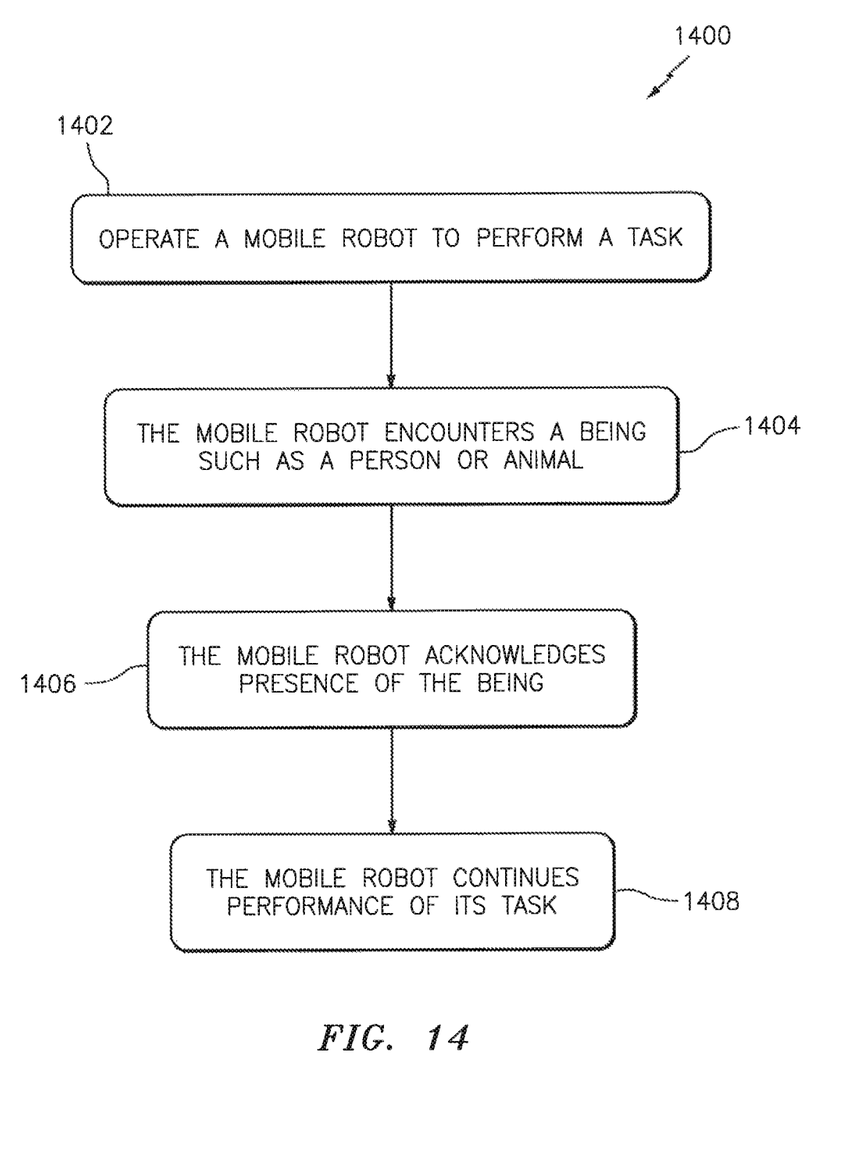
FIG. 14 is a flow diagram of a method involving a vehicle and at least one being in an operating environment.

FIG. 14 is a flow diagram of a method 1400 involving a mobile robot such as the mobile robot 20 of FIGS. 1 and 9-13 within its operating environment 22. This method 1400 also involves at least one individual 26 and one or more items 24.

Each of the item(s) 24 may be configured as a packaging device, which may hold, support and/or otherwise contain one or more gaseous, liquid and/or solid materials. An example of a packaging device is a container such as a box, a lockbox, a crate, a canister, a bin, a pressure vessel, a tank, a suitcase, a vial or a pill box. Other examples of a packaging device include, but are not limited to, a pallet, a rack, a sack, a bag, a tube, or wrapping or packaging material. While a packaging device may take various different forms as indicated above, the packaging devices described below will be referred to as containers for ease of description.

Each container may be empty or, alternatively, partially or completely filled or loaded with one or more other items; i.e., the contents of the item 24. These contents may include various types of government, business and/or consumer articles; e.g., commodities. Alternatively, one or more of the items 24 may themselves each be configured as or otherwise include one or more of the government, business and/or consumer articles. The mobile robot 20 of the present disclosure, of course, is not limited to performing task(s) related to the foregoing exemplary items 24.

In step 1402, the mobile robot 20 is operated to perform at least one task. The mobile robot 20, for example, may be operated to autonomously transport the items 24 from a first location to a second location within the operating environment 22. More particularly, after receiving one or more of the items 24 on or in one or more of its item supports 74 (e.g., drawers, cabinets, compartments, decks, beds, etc.), the controller 36 may signal the drive system 34 to move the mobile robot 20 along a path between the first location and the second location. To avoid a known or unknown obstacle (e.g., human, object or any other type of other entity) along the path, the controller 36 may signal the drive system 34 to slightly or dramatically divert its course (e.g., perform a maneuver as shown in FIGS. 5 and 7) around the obstacle based on data received from the sensor system 30. The controller 36 may also or alternatively signal the obstacle (e.g., a remotely actuator doorway) to partially or completely move or open. Upon arriving at the second location, the controller 36 may signal the drive system 34 to stop and "park" the mobile robot 20 while the items 24 are delivered.

The mobile robot 20 may also be tasked to autonomously gather one or more of the items 24 with its manipulator system 58. For example, based on sensor data, the controller 36 may signal the manipulator system 58 to pick up at least one item and place that item onto its support surface 74. The mobile robot 20 may also or alternatively be tasked to autonomously deliver one or more of the items 24 with its manipulator system 58. For example, based on sensor data, the controller 36 may signal the manipulator system 58 to pick up at least one item off of its support surface 74 and place that item on or in a designated area next to the mobile robot 20.

The task(s) performed in the step 1402, of course, need not be related to item pickup, transportation and/or delivery. For example, the mobile robot 20 may be tasked to manipulate at least one item. In another example, the mobile robot 20 may be tasked to perform another type of task such as, but not limited to, transport one or more people within the operating environment 22, move to a location to receive or begin another task, clean one or more portions of the operating environment 22 (e.g., where the mobile robot 20 is configured with a cleaning device such as a vacuum and/or a mopping device), etc.

In step 1404, the mobile robot 20 encounters at least one individual 26; i.e., a being. This encounter may be similar to one of the encounters described above with reference to FIGS. 2-8. Alternatively, the encounter may be another type of encounter. For ease of description, however, the encounter is referred to below as a simple passing encounter as illustrated in FIG. 2. In generally, the encounter will occur sometime while the mobile robot 20 is performing its task(s). However, the encounter may alternatively occur at the beginning or the end of task performance.

Before, at the start of and/or during the encounter, the mobile robot 20 senses the presence of the individual 26. The sensor system 30, for example, may provide the controller 36 with sensor data which indicates the individual 26 is at a certain location. The controller 36 may also process this data as a function of time and/or the individual's 26 orientation to determine a predicted course of the individual 26.

In step 1406, the mobile robot 20 acknowledges the presence of the individual 26; i.e., a being. This acknowledgement may be made before the actual encounter. The mobile robot 20, for example, may signal the individual 26 that it is aware of the individual's 26 presence while the individual 26 is still a relatively far distance away from the mobile robot 20; e.g., outside of the common region 28. The mobile robot 20 may also or alternatively signal the individual 26 that it is coming even if there is no direct line of sight to the individual 26. For example, the mobile robot 20 may receive sensor data from other discrete sensors (e.g., a building security system, etc.) and/or utilize a remote communication system to signal the individual 26, etc.

The acknowledgement may also or alternatively be made at the start of the encounter. The mobile robot 20, for example, may signal the individual 26 that it is aware of the individual's 26 presence as soon as or approximately when that individual 26 enters the common region 28.

The acknowledgement may also or alternatively be made during the encounter. The mobile robot 20, for example, may repetitively, continuously, etc. signal the individual 26 that it is aware of the individual's 26 presence until that individual 26 leaves the common region 28; e.g., once the mobile robot 20 passes the individual 26.

The mobile robot 20 may acknowledge the presence of the individual 26 visually, audibly and/or otherwise. The mobile robot 20, for example, may present a visual signal or message to the individual 26 using the user interface 46; e.g., the display, etc. The mobile robot 20 may present an audible signal or message to the individual 26 using the user interface 46; e.g., the loudspeaker. The mobile robot 20 may also or alternatively present a visual signal or message to the individual 26 by gesturing with its manipulator system 58. The mobile robot 20 may still also or alternatively present a signal or message using a remote device; e.g., another device's user interface.

The acknowledgement may be provided to convey various types of information. However, the information and the acknowledgement in general are not task related (or peripheral); e.g., the task(s) may be completed without an acknowledgement of the individual's 26 presence. Examples of the acknowledgements are provided below. These acknowledgements may be explicit and/or inferred, similar to acknowledgements made in everyday life between people. The present disclosure, of course, is not limited to the exemplary acknowledgements and information provided below.

The acknowledgement may inform or infer to the individual 26 that the mobile robot 20 senses his/her presence. For example, the mobile robot 20 may visually and/or audibly present:
 A greeting such as "hello", "hi", "howdy", "good morning", "good afternoon" or "good evening"; and/or
 A message such as "I see you there", "I still see you", "I'm watching you", "I hope you are having a good day", etc.

The acknowledgement may provide the individual 26 with information regarding a current or future operation of the mobile robot 20. For example, the mobile robot 20 may visually and/or audibly present a message such as:
 "I'm going to the [direction such as straight, right, left]";
 "I'll stop and wait for you";
 "I'm slowing down";
 "I'm speeding up";
 "I'm headed to the [destination such as BLANK room, or BLANK building]";
 "I following the [BLANK] pathway" and/or
 "I'm on [classification/status such as urgent, routine, etc.] business".

The acknowledgement may request the individual 26 to (or not to) perform an action. For example, the mobile robot 20 may visually and/or audibly present a message such as:

"Please move to the side of the pathway";
"Please clear the way and let me through";
"Please pass me to the [direction such as right or left]"; and/or
"Please continue on your way".

The acknowledgement may also or alternatively convey an exclamatory and/or apologetic message. For example, the mobile robot 20 may visually and/or audibly present a message such as:
"Excuse me";
"Pardon me";
"Please forgive me";
"My apologies";
"Watch out";
"Coming through";
"Urgent matter"; and/or
"Oops".

This last type of acknowledgement may be particularly suited to (e.g., unexpected) encounters such as those illustrated in FIGS. 5-8. Furthermore, this last type of acknowledgement may also be accompanied by additional information such as: "Excuse me . . . " and "I'll back up" or "I'll move to the side".

In step 1408, the mobile robot 20 continues performance if its task(s). For example, where the mobile robot 20 temporarily paused task performance to let the individual 26 pass, the mobile robot 20 may resume performance of its task(s) after or at the end of the encounter. Or, where the mobile robot 20 changes its speed and/or course during the encounter, the mobile robot 20 may resume its original course and/or speed at the end of or after the encounter. Alternatively, where there is no other interaction between the mobile robot 20 and the individual 26 except for the acknowledgement, the mobile robot 20 may simply continue performance of its task(s) during and after the acknowledgement. The mobile robot 20, for example, may travel along the same course and at the same speed during and after the encounter as it was before the encounter.

In some embodiments, the acknowledgement of step 1406 may be paired with one or more maneuvers. Examples of a maneuver are shown in FIGS. 5 and 7. Other exemplary maneuvers include:
 Stopping mobile robot 20 movement;
 Reversing mobile robot 20 movement;
 Directing mobile robot 20 movement away from the individual 26;
 Moving the mobile robot 20 to the side;
 Slowing mobile robot 20 movement down to avoid collision; and/or
 Speeding mobile robot 20 movement up to avoid collision.

The present disclosure, however, is not limited to the foregoing exemplary maneuvers.

In some embodiments, the mobile robot 20 may be operated to determine a proximity (e.g., ETA and/or distance) of the individual 26 to the mobile robot 20. The controller 36, for example, may utilize sensor data to determine the distance between the mobile robot 20 and the individual 26. The controller 36 may also or alternatively utilize the sensor data to determine an estimated time of arrival (ETA) of the mobile robot 20 to the individual 26. When the determined distance and/or ETA is equal to or below a value, the mobile robot 20 may acknowledge the presence of the individual 26. It is worth noting, the value may be constant or variable in order to account for changing or unknown (e.g., determinable) environmental conditions.

In some embodiments, the mobile robot 20 may also or alternatively be tasked to reconfigure one or more of the items 24. The mobile robot 20, for example, may use one or more of its manipulators 60 to re-orient, open, change the form of, or otherwise configure an item 24. For example, the mobile robot 20 may open the item 24 to remove some or all of its contents. In another example, the mobile robot 20 may wrap the item in packaging material and/or affix a label to the item 24.

It is to be understood that the terminology used herein is used for the purpose of describing specific embodiments, and is not intended to limit the scope of the present disclosure. It should be noted that as used herein, the singular forms of "a", "an" and "the" include plural references unless the context clearly dictates otherwise. In addition, unless defined otherwise, all technical and scientific terms used herein have the same meaning as commonly understood by one of ordinary skill in the art to which this disclosure belongs.

Although the description above contains many specific examples, these should not be construed as limiting the scope of the embodiments of the present disclosure, but as merely providing illustrations of some of the presently preferred embodiments of the present invention. It will be appreciated by those skilled in the art that changes could be made to the embodiments described above without departing from the broad inventive concept thereof. It is to be understood therefore that this disclosure is not limited to the specific embodiments disclosed herein, but it is intended to cover modifications within the spirit and scope of the embodiments of the present disclosure. Accordingly, the present invention is not to be restricted except in light of the attached claims and their equivalents.

What is claimed is:

1. A method of operating an autonomous mobile robot in close proximity to a being, comprising:
    operating a drive system of the mobile robot to autonomously move within an environment;
    providing a communication system for enabling communication between the mobile robot and the being; and
    providing a controller configured to:
        control operation of the mobile robot, the operation including autonomously moving the mobile robot within the environment using the drive system to perform at least one task;
        detect, within received sensor data, a being within the environment that is in substantially close proximity to the mobile robot;
        perform a temporal analysis on the received sensor data to generate a predicted course of the detected being;
        determine, based at least in part on the predicted course of the detected being, an estimated time of arrival (ETA) of the mobile robot to a future encounter with the detected being, wherein the future encounter comprises the mobile robot and the predicted course of the detected being both being located within a common region;
        generate and transmit, based at least in part on the ETA of the mobile robot to the future encounter, an acknowledgement message from the mobile robot to the detected being, wherein the acknowledgement message indicates that the mobile robot has identified the future encounter;
        determine one or more modification actions to cause an adjustment in the future encounter; and
        generate and transmit an announcement message from the mobile robot to the detected being, wherein the announcement message is indicative of the one or more determined modification actions and is transmitted prior to the occurrence of the future encounter.

2. The method as defined in claim 1, wherein the acknowledging comprises physical gesturing with at least one component of the mobile robot.

3. The method as defined in claim 1, wherein the acknowledgement is in the form of a common phrase or gesture typically utilized between beings when they encounter each other in an environment.

4. The method as defined in claim 1, wherein the mobile robot has a substantially humanoid form and the acknowledgment is a gesture composed of moving one or more parts of the humanoid mobile robot that typically is utilized between beings when they encounter each other in an environment.

5. The method as defined in claim 1, wherein the visual and/or audible acknowledgement includes informing the being that the mobile robot is aware of the being's presence and will pause its operation to avoid physical contact with the being.

6. The method as defined in claim 1, wherein the visual and/or audible acknowledgement includes informing the being that the mobile robot is aware of the being's presence and will continue on its present course to avoid physical contact with the being.

7. The method as defined in claim 1, wherein the visual and/or audible acknowledgement includes informing the being that the mobile robot is aware of the being's presence and will divert from its present course to a different course to avoid physical contact with the being.

8. The method as defined in claim 1, wherein identifying one or more beings within the environment that are in substantially close proximity to the mobile robot is accomplished by a system that is in a physical position that is remote from the mobile robot.

9. The method as defined in claim 1, wherein the visual and/or audible acknowledgement is provided as soon as a being enters a common region within the environment regardless of whether there is a direct line of sight between the being and a mobile robot.

10. The method as defined in claim 1, wherein the visual and/or audible acknowledgement is provided prior to a being entering a common region within the environment regardless of whether there is a direct line of sight between the being and the mobile robot.

11. The method as defined in claim 1, wherein a visual acknowledgement is provided to a being via a user interface of the mobile robot in the form of a display.

12. The method as defined in claim 1, wherein the visual and/or audible acknowledgement includes instructions for the being to move so that the mobile robot can avoid physical contact with the being.

* * * * *